(12) United States Patent
Iida et al.

(10) Patent No.: US 11,214,195 B2
(45) Date of Patent: Jan. 4, 2022

(54) ELECTRONIC MIRROR SYSTEM

(71) Applicant: TOYOTA JIDOSHA KABUSHIKI KAISHA, Toyota (JP)

(72) Inventors: Tomoaki Iida, Okazaki (JP); Tomoyuki Yoshida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 16/684,800

(22) Filed: Nov. 15, 2019

(65) Prior Publication Data

US 2020/0207271 A1 Jul. 2, 2020

(30) Foreign Application Priority Data

Dec. 26, 2018 (JP) .............................. JP2018-243381

(51) Int. Cl.
*B60R 1/00* (2006.01)
*H04N 5/232* (2006.01)
(Continued)

(52) U.S. Cl.
CPC ........... *B60R 1/00* (2013.01); *H04N 5/23238* (2013.01); *H04N 5/23245* (2013.01); *H04N 5/247* (2013.01); *H04N 5/2628* (2013.01); *H04N 5/445* (2013.01); *H04N 21/42204* (2013.01); *B60R 2300/101* (2013.01);
(Continued)

(58) Field of Classification Search
CPC ................ B60R 1/00; B60R 2300/101; B60R 2300/102; B60R 2300/105; B60R 2300/308; B60R 2300/8046; B60R 2300/306; B60R 2300/806; B60R 2300/70; B60R 2300/802; H04N 5/4403;
(Continued)

(56) References Cited

U.S. PATENT DOCUMENTS 10,334,156 B2 * 6/2019 Chaney, Jr. ............ H04N 5/343
2006/0251502 A1 * 11/2006 Scharfenberger ..... B60P 1/4471
414/537
(Continued)

FOREIGN PATENT DOCUMENTS

| EP | 2 228 259 A1 | 9/2010 |
| JP | 2016-124391 A | 7/2016 |
| JP | 2017-034430 A | 2/2017 |

*Primary Examiner* — John W Miller
*Assistant Examiner* — Sean N. Haiem
(74) *Attorney, Agent, or Firm* — Sughrue Mion, PLLC

(57) ABSTRACT

A display system includes an imaging section, a display section, a selection section, an operation section, and a display control section. The imaging section is configured to image toward a rear and a side of a vehicle. The display section is configured to display an image captured by the imaging section. The selection section is configured to allow selection of a standard mode or a wide-angle mode. The
(Continued)

operation section is configured to enable operation of one out of forward driving or reverse driving of the vehicle. The display control section includes RAM, and switches to whichever mode has been set out of the standard mode or the wide-angle mode immediately prior to the vehicle being driven in reverse in cases in which an operation to switch from reverse driving to forward driving of the vehicle has been performed using the operation section while in a reverse driving mode.

4 Claims, 12 Drawing Sheets

(51) Int. Cl.
*H04N 5/247* (2006.01)
*H04N 5/262* (2006.01)
*H04N 5/445* (2011.01)
*H04N 21/422* (2011.01)

(52) U.S. Cl.
CPC ... *B60R 2300/105* (2013.01); *B60R 2300/308* (2013.01); *B60R 2300/8046* (2013.01); *H04N 21/42208* (2013.01)

(58) Field of Classification Search
CPC ...... H04N 5/445; H04N 5/2628; H04N 5/247; H04N 5/23245; H04N 5/23238; H04N 2005/4408
USPC .................................... 348/39, 148; 414/537
See application file for complete search history.

(56) References Cited

U.S. PATENT DOCUMENTS

| | | | |
|---|---|---|---|
| 2008/0077882 A1* | 3/2008 | Kramer | B60K 35/00 715/810 |
| 2010/0231715 A1* | 9/2010 | Garner | B60R 1/00 348/148 |
| 2011/0254957 A1* | 10/2011 | Eder | G06T 3/0018 348/148 |
| 2012/0154591 A1* | 6/2012 | Baur | B60R 1/00 348/148 |
| 2012/0162427 A1* | 6/2012 | Lynam | H04N 5/247 348/148 |
| 2016/0185292 A1* | 6/2016 | Asai | B60R 1/00 348/148 |
| 2017/0228605 A1* | 8/2017 | Konishi | B60K 35/00 |
| 2017/0232898 A1* | 8/2017 | Maejima | H04N 5/247 348/118 |
| 2018/0160030 A1* | 6/2018 | Chaney, Jr. | B60R 1/06 |
| 2019/0327415 A1* | 10/2019 | Prabhakar | H04N 5/23293 |

* cited by examiner

ELECTRONIC MIRROR SYSTEM

CROSS-REFERENCE TO RELATED APPLICATION

This application is based on and claims priority under 35 USC 119 from Japanese Patent Application No. 2018-243381 filed on Dec. 26, 2018, the disclosure of which is incorporated by reference herein.

BACKGROUND

Technical Field

The present disclosure relates to an electronic mirror system.

Related Art

Japanese Patent Application Laid-Open (JP-A) No. 2016-124391 (Patent Document 1) discloses an electronic mirror device including an imaging section that images rearward from a vehicle, and a display section that displays images. Images corresponding to different imaging ranges are displayed on the display section in cases in which a shift position of the vehicle corresponds to a forward driving position, in cases in which the shift position corresponds to a reverse driving position, or in cases in which the shift position corresponds to the reverse driving position and a predetermined condition has been satisfied. Specifically, in cases in which the shift position has been changed to a position other than the reverse range, a processing section displays a standard display image on the display section.

SUMMARY

Electronic mirror systems exist in which is it possible to switch between a standard mode in which an image with a standard view angle is displayed and a wide-angle mode in which an image with a wider view angle than the standard view angle is displayed, and that also include a reverse driving mode in which an image for reverse driving is displayed when the vehicle is being driven in reverse. In such electronic mirror systems, if, as in the electronic mirror device of Patent Document 1, the mode returns to the standard mode when switching from reverse driving to forward driving, it is necessary to operate a switch in order to transition to the wide-angle mode each time such a switch occurs, which an occupant may find frustrating.

In consideration of the above circumstances, an object of the present disclosure is to obtain an electronic mirror system capable of suppressing an occupant from feeling frustrated when switching from reverse driving to forward driving in a configuration including a standard mode, a wide-angle mode, and a reverse driving mode as display modes of an image on a display section.

An electronic mirror system of a first aspect of the present disclosure includes an imaging section, a display section, a selection section, an operation section, and a display control section. The imaging section is configured to perform imaging toward a rear and a side of a vehicle, and is provided so as to be capable of changing an imaging range between a first imaging range and a second imaging range that is wider than the first imaging range. The display section is configured to display an image captured by the imaging section. The selection section is configured to allow selection of one of a standard mode in which an image corresponding to the first imaging range is displayed at the display section, or a wide-angle mode in which an image corresponding to the second imaging range is displayed at the display section. The operation section is configured to enable operation of one of forward driving or reverse driving of the vehicle. The display control section includes a setting section which is set with whichever of the standard mode or the wide-angle mode has been selected using the selection section, displays an image corresponding to the first imaging range at the display section in a cases in which the standard mode has been selected using the selection section, that displays an image corresponding to the second imaging range at the display section in a cases in which the wide-angle mode has been selected using the selection section, and displays an image for reverse driving at the display section as a reverse driving mode in a cases in which an operation to drive the vehicle in reverse has been performed using the operation section. The display control section also switches the mode to whichever of the standard mode or the wide-angle mode was set immediately prior to the vehicle being driven in reverse in a cases in which an operation to switch from reverse driving to forward driving of the vehicle has been performed using the operation section while in the reverse driving mode.

In the electronic mirror system of the first aspect, the standard mode in which an image corresponding to the first imaging range is displayed at the display section, and the wide-angle mode in which an image corresponding to the second imaging range is displayed at the display section, are selected using the selection section. When the vehicle is being driven in reverse, the display control section displays the image for reverse driving at the display section as the reverse driving mode.

The display control section switches to whichever mode has been set in the setting section out of the standard mode or the wide-angle mode immediately prior to the vehicle being driven in reverse in cases in which an operation to switch from reverse driving to forward driving of the vehicle has been performed using the operation section while in the reverse driving mode. Thus, the range of the image displayed at the display section before and after an operation to switch to reverse driving and then revert back to forward driving is thus maintained as whichever has been set in the setting section out of the first imaging range or the second imaging range immediately prior to the vehicle being driven in reverse. This eliminates the need to operate a switch in order to transition between modes every time switching is performed, thereby enabling frustration felt by an occupant when switching from reverse driving to forward driving to be suppressed.

The display control section of an electronic mirror system of a second aspect of the present disclosure may be configured to display an image corresponding to a third imaging range on the display section as the image for reverse driving, the third imaging range having the same view angle as a view angle of the second imaging range and a larger vehicle vertical direction display magnification ratio than the second imaging range, such that an aspect ratio of the third imaging range is the same as an aspect ratio in the standard mode. Note that "the aspect ratios being the same" is not limited to aspect ratios that are exactly the same, and also includes cases in which the aspect ratios differ but are nonetheless capable of obtaining similar advantageous effects to a case in which the aspect ratios were the same.

In the electronic mirror system of the second aspect, the image displayed at the display section when driving in reverse is configured by the image corresponding to the third imaging range that is maintained in a wide-angle state, while having the same aspect ratio as the aspect ratio of the image corresponding to the standard mode. Thus, the aspect ratio of objects as perceived by the occupant during forward driving of the vehicle is similar to the aspect ratio of objects as perceived by the occupant when the vehicle is being driven in reverse, thereby enabling any unnatural sensation experienced by the occupant when driving in reverse to be suppressed.

The display control section of an electronic mirror system of a third aspect of the present disclosure is configured to display an indicator indicating that reverse driving is in progress on an image corresponding to the second imaging range as the image for reverse driving.

In the electronic mirror system of the third aspect, displaying the indicator indicating that reverse driving is in progress on an image corresponding to the second imaging range enables the image for reverse driving to be displayed in a simple manner.

The display control section of an electronic mirror system of a fourth aspect of the present disclosure is configured to display brackets at positions corresponding to four corners of the first imaging range in the image corresponding to the second imaging range when in the wide-angle mode.

In the electronic mirror system of the fourth aspect, a sense of the distance to surrounding objects can be made easier to grasp, even immediately after zooming in on or zooming out from the image displayed on the display section.

Advantageous Effects of Disclosure

The present disclosure is able to obtain an electronic mirror system capable of suppressing an occupant from feeling frustrated when switching from reverse driving to forward driving in a configuration including a standard mode, a wide-angle mode, and a reverse driving mode as display modes of an image on a display section.

BRIEF DESCRIPTION OF THE DRAWINGS

Preferred embodiments will be described in detail based on the following figures, wherein.

DETAILED DESCRIPTION

First Exemplary Embodiment

Figure 1:
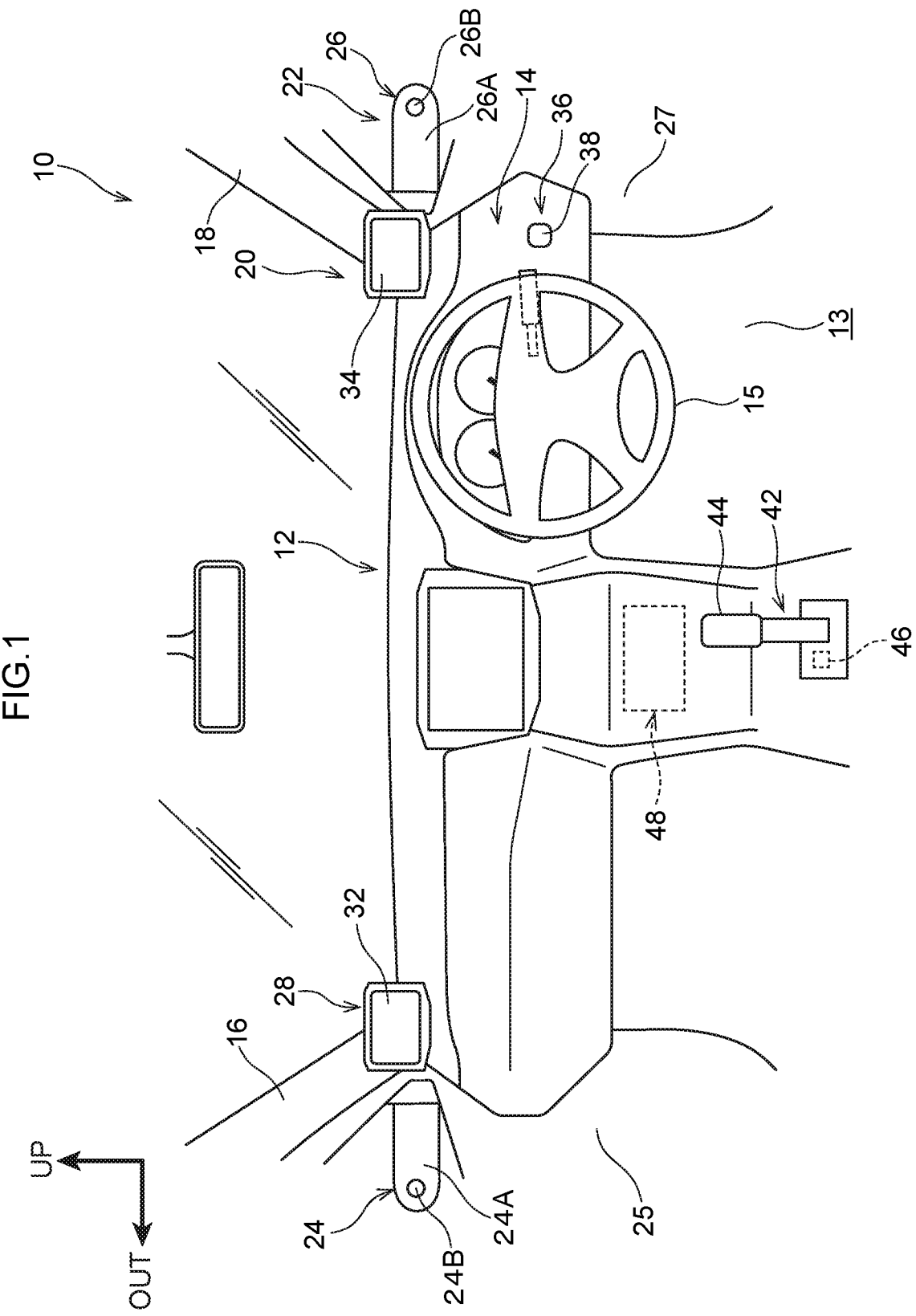
FIG. 1 is a schematic view illustrating an instrument panel of a vehicle including a display system according to a first exemplary embodiment in a state viewed from a vehicle cabin interior.

FIG. 1 illustrates part of a vehicle 10 applied with a display system 20, serving as an example of an electronic mirror system according to a first exemplary embodiment. Note that the arrow UP indicates a vehicle vertical direction upper side, and the arrow OUT indicates a vehicle width direction outer side. Although not illustrated, a vehicle front-rear direction is orthogonal to the vehicle vertical direction and the vehicle width direction. Unless specifically stated otherwise, in the below explanation, front and rear, up and down, and left and right correspond to front and rear in the vehicle front-rear direction, up and down in the vehicle vertical direction, and left and right in the vehicle width direction when facing in the direction of travel. Configuration elements or portions that are the same as or equivalent to each other in the respective drawings are appended with the same reference numerals. Moreover, proportions in the drawings may be exaggerated to aid explanation and thus may differ from the true proportions.

The vehicle 10 is configured including a vehicle body 12, an instrument panel 14, a steering wheel 15, a left front pillar garnish 16, a right front pillar garnish 18, a left front side door 25, and a right front side door 27. The vehicle body 12 includes a vehicle cabin 13. As an example, non-illustrated millimeter-wave radar is installed in the vehicle 10.

Hardware Configuration

Figure 2:
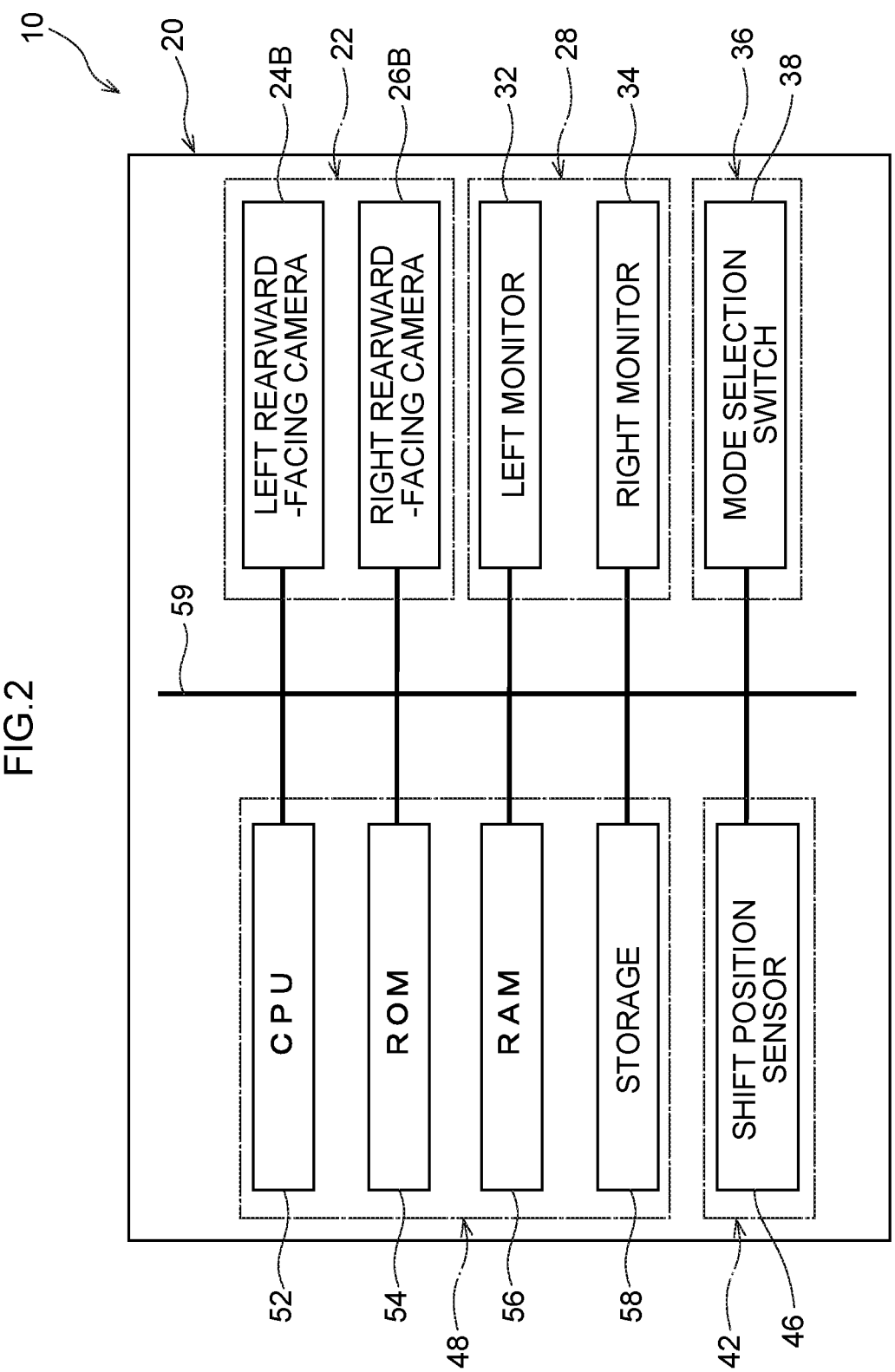
FIG. 2 is a block diagram illustrating hardware configuration of a display system according to the first exemplary embodiment.

As an example, the display system 20 illustrated in FIG. 2 includes a camera unit 22, a monitor unit 28, a switch unit 36, a shift lever unit 42, and a control unit 48. The camera unit 22, the monitor unit 28, the switch unit 36, the shift lever unit 42, and the control unit 48 are connected together so as to be capable of communicating with each other through a bus 59.

Camera Unit

As illustrated in FIG. 1, the camera unit 22 includes a left camera section 24 and a right camera section 26.

The left camera section 24 includes a left support body 24A and a left rearward-facing camera 24B. The left support body 24A has a substantially rectangular block shape with a leading end portion formed in a circular arc shape. A base end portion of the left support body 24A is attached to a vehicle front-rear direction front end portion of a vehicle vertical direction intermediate portion of the left front side door 25. Namely, the left support body 24A is attached to the left front side door 25 such that its leading end portion projects toward the vehicle outer side. Furthermore, that left support body 24A is capable of swinging in the vehicle front-rear direction about an axial direction running along the vehicle vertical direction. The left support body 24A is capable of being swung by drive force from a non-illustrated actuator between a stowed position where the length direction of the left support body 24A runs substantially along an outer face of the vehicle 10, and a return position from which the left rearward-facing camera 24B images toward the rear-left of the vehicle 10.

The left rearward-facing camera 24B is attached to the leading end portion of the left support body 24A. Specifically, an imaging optical axis (lens optical axis) of the left rearward-facing camera 24B is directed toward the rear-left of the vehicle 10, such that the left rearward-facing camera 24B images toward the rear-left of the vehicle 10. The left rearward-facing camera 24B is capable of switching an imaging range S (see FIG. 4) at the rear-left of the vehicle 10 between a standard first imaging range SA (see FIG. 4), and a wide-angle second imaging range SB (see FIG. 5) that has a wider view angle than the first imaging range SA. As an example, switching between the first imaging range SA and the second imaging range SB is performed by digitally zooming in or zooming out (trimming). The first imaging range SA is included within the second imaging range SB. Namely, the left rearward-facing camera 24B continuously images the second imaging range SB, cropping to and enlarging part of the second imaging range SB when switched to the first imaging range SA.

The right camera section 26 includes a right support body 26A and a right rearward-facing camera 26B, and is capable of switching an imaging range S at the rear-right of the vehicle 10 between a standard first imaging range and a wide-angle second imaging range. Note that as an example, the structure of the right camera section 26 is symmetrical to the structure of the left camera section 24 about the vehicle width direction center of the vehicle 10. Detailed illustration and explanation of the right camera section 26 are therefore omitted.

Monitor Unit

The monitor unit 28 includes a left monitor 32 and a right monitor 34.

As an example, the left monitor 32 is provided inside the vehicle cabin 13 in the vicinity of a lower end of the left front pillar garnish 16. The left monitor 32 is a monitor for displaying a rear-left image captured by the left rearward-facing camera 24B, and is configured by a liquid crystal panel as an example. Namely, the left monitor 32 functions as a substitute for a left outer mirror. A non-illustrated occupant (driver) of the vehicle 10 is able to check the situation in a restricted view region at the rear-left of the vehicle 10 by viewing the image displayed on the left monitor 32.

As an example, the right monitor 34 is provided inside the vehicle cabin 13 in the vicinity of a lower end of the right front pillar garnish 18. The right monitor 34 is a monitor for displaying a rear-right image captured by the right rearward-facing camera 26B, and is configured by a liquid crystal panel as an example. Namely, the right monitor 34 functions as a substitute for a right outer mirror. The occupant of the vehicle 10 is able to check the situation in a restricted view region at the rear-right of the vehicle 10 by viewing the image displayed on the right monitor 34.

Switch Unit

The switch unit 36 is configured including a mode selection switch 38. As an example, the mode selection switch 38 is provided in an exposed state on the instrument panel 14, at a location at the vehicle width direction outer side of the steering wheel 15 and at the vehicle vertical direction lower side of the right monitor 34. The switch unit 36 is placed in an ON state by being pressed once toward the vehicle front side, and is placed in an OFF state by being pressed once more toward the vehicle front side when in the ON state.

A signal corresponding to the ON state or a signal corresponding to the OFF state of the switch unit 36 is transmitted to the control unit 48, described later. Note that when the switch unit 36 is in the OFF state, the camera unit 22 operates in a standard mode in which the imaging range S is configured by the first imaging range SA (see FIG. 4). When the switch unit 36 is in the ON state, the camera unit 22 operates in a wide-angle mode in which the imaging range S is configured by the second imaging range SB (see FIG. 5).

Shift Lever Unit

The shift lever unit 42 is a floor-mounted shift that is provided to a floor of the vehicle 10 between a driver seat and a front passenger seat. The shift lever unit 42 includes non-illustrated P (parking), R (reverse), N (neutral), and D (drive) ranges. Specifically, the shift lever unit 42 is configured including a shift lever 44, a shift position sensor 46, and a non-illustrated detent member.

The shift lever 44 is provided so as to be capable of pivoting in the front-rear direction of the vehicle 10. The shift lever 44 is switched between the P range, the R range, the N range, and the D range by driver operation.

In the following explanation, a state of the vehicle 10 in which the shift lever 44 has been switched to the D range and a non-illustrated accelerator pedal has been operated is referred to as a forward driving state of the vehicle 10. A state of the vehicle 10 in which the shift lever 44 has been switched to the R range and the non-illustrated accelerator pedal has been operated is referred to as a reverse driving state of the vehicle 10. States in which the shift lever 44 has been placed in the P range or the N range are referred to as stationary states of the vehicle 10.

The shift position sensor 46 is a sensor for detecting the shift position (range) of the shift lever 44. As an example, the shift position sensor 46 is what is referred to as a contact-type mechanical switch that detects the shift position of the shift lever 44 through contact with part of the shift lever 44. A signal corresponding to the shift position of the shift lever 44 detected by the shift position sensor 46 is transmitted to the control unit 48, described below.

Control Unit

As illustrated in FIG. 2, the control unit 48 includes a central processing unit (CPU) 52, read only memory (ROM) 54, random access memory (RAM) 56, and storage 58.

The CPU 52 is a central processing unit that executes various programs and controls the various sections of the display system 20. Namely, the CPU 52 reads a program from the ROM 54 or the storage 58, and executes the program using the RAM 56 as a workspace. The CPU 52 controls the various configuration elements, performs various computation processing, and so on based on the program recorded in the ROM 54 or the storage 58.

The ROM 54 holds various programs and various data. The RAM 56 acts as a workspace that temporarily stores programs or data. The RAM 56 functions as a storage section that stores whichever mode has been set from out of the standard mode or the wide-angle mode immediately prior to the vehicle 10 being driven in reverse. In other words, the RAM 56 is an example of a setting section which is set with one mode from out of the standard mode or the wide-angle mode immediately prior to the vehicle 10 being driven in reverse. Note that in the following explanation, the act of storing the one mode out of the standard mode or the wide-angle mode that was selected immediately prior to the vehicle 10 being driven in reverse in the RAM 56 is referred to as "setting". The storage 58 is configured by flash ROM (read only memory), and holds various programs including an operating system, and various data.

In the present exemplary embodiment, a display switching program for switching the imaging range S (see FIG. 4 and FIG. 5) of the image imaged by the camera unit 22 in response to forward driving or reverse driving of the vehicle 10 is held in the ROM 54 or the storage 58. "Switching the imaging range in response to forward driving or reverse driving of the vehicle 10" is synonymous with "switching the imaging range in response to the shift position of the shift lever 44 (see FIG. 1).

The control unit 48 is configured so as to set in the RAM 56 whichever display mode out or the standard mode or the wide-angle mode has been selected.

Functional Configuration

When executing the display switching program, the display system 20 employs the above hardware resources to realize various functions. Explanation follows regarding the functional configurations realized by the display system 20.

Figure 3:
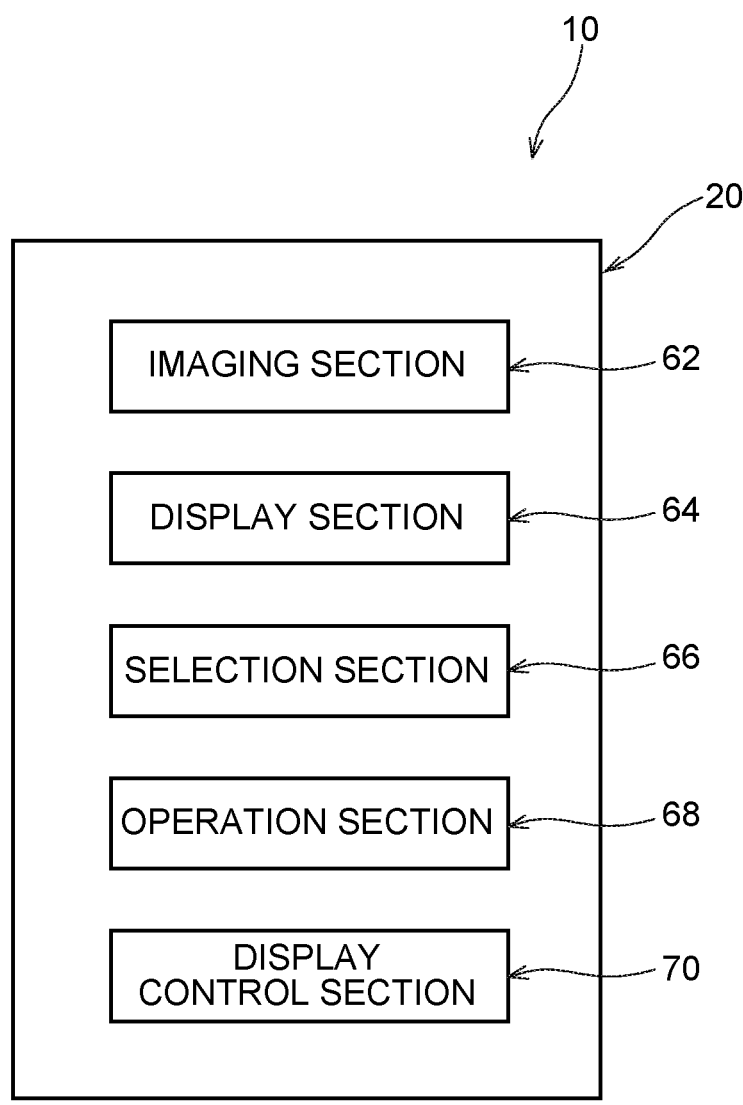
FIG. 3 is a block diagram illustrating an example of functional configuration of a display system according to the first exemplary embodiment.

As illustrated in FIG. 3, the display system 20 includes an imaging section 62, a display section 64, a selection section 66, an operation section 68, and a display control section 70 as functional configuration. Each functional configuration is realized by the CPU 52 of the control unit 48 reading and executing the display switching program stored in the ROM 54 or the storage 58 (see FIG. 2).

The imaging section 62 captures video images of areas at the vehicle rear and vehicle sides (the vehicle rear and sides) using the camera unit 22 (see FIG. 2). Since the camera unit 22 includes the left rearward-facing camera 24B and the right rearward-facing camera 26B (see FIG. 2), the camera unit 22 images areas at the vehicle rear and sides separately on the left and right of the vehicle 10. Areas at the vehicle sides imaged by the left rearward-facing camera 24B and the right rearward-facing camera 26B refer to ranges at the vehicle rear side and vehicle width direction outer sides from the perspective of the respective positions where the left rearward-facing camera 24B and the right rearward-facing camera 26B are provided to the vehicle 10. The imaging section 62 is provided so as to be capable of changing each of the imaging ranges S between the first imaging range SA (see FIG. 4) and the second imaging range SB (see FIG. 5) previously described.

The display section 64 displays images captured by the imaging section 62. Specifically, the display section 64 uses the left monitor 32 and the right monitor 34 (see FIG. 1) to display images captured by the imaging section 62 and processed by the display control section 70, described later.

The selection section 66 is configured to allow the occupant (driver) of the vehicle 10 to select one out of the standard mode, in which an image corresponding to the first imaging range SA is displayed on the display section 64, or the wide-angle mode, in which an image corresponding to the second imaging range SB is displayed on the display section 64. Specifically, the standard mode is selected if the occupant has not pressed the mode selection switch 38 (see FIG. 1). The wide-angle mode is selected if the occupant presses the mode selection switch 38 while in the standard mode. An information signal corresponding to the selected mode is transmitted to the display control section 70.

The operation section 68 is configured capable of changing between one or the other operation out of forward driving or reverse driving of the vehicle 10, according to operation of the shift lever 44 (see FIG. 1) by the occupant. Namely, the operation section 68 enables one or the other operation out of forward driving or reverse driving of the vehicle 10. The shift position of the shift lever 44 is detected by the shift position sensor 46 (see FIG. 1). An information signal corresponding to the shift position of the shift lever 44 detected by the shift position sensor 46 is transmitted to the display control section 70.

The display control section 70 includes the RAM 56 (see FIG. 2) which is set with the mode out of the standard mode or the wide-angle mode selected using the selection section 66. The display control section 70 receives image information captured by the imaging section 62, performs image processing on the received image information according to the circumstances, and outputs an image to the display section 64. Namely, after performing image processing according to the circumstances on an image captured by the left rearward-facing camera 24B (see FIG. 1), the image is output to the left monitor 32 (see FIG. 1). Similarly, after performing image processing according to the circumstances on an image captured by the right rearward-facing camera 26B (see FIG. 1), the image is output to the right monitor 34 (see FIG. 1). In the present exemplary embodiment, the addition of assist lines H (see FIG. 6), described later, to the image is an example of image processing according to the circumstances.

Specifically, in cases in which the standard mode has been selected using the selection section 66, the display control section 70 performs control such that an image M1 corresponding to the first imaging range SA (see FIG. 4) is displayed on the display section 64. In cases in which the wide-angle mode has been selected using the selection section 66, the display control section 70 performs control such that an image M2 corresponding to the second imaging range SB (see FIG. 5) is displayed on the display section 64. Furthermore, in cases in which an operation to drive the vehicle in reverse has been performed using the operation section 68, the display control section 70 performs control such that an image M3 (see FIG. 6) for reverse driving is displayed on the display section 64. The image M3 is described later.

Moreover, in cases in which an operation to switch from reverse driving to forward driving of the vehicle 10 has been performed using the operation section 68 when in the reverse driving mode, the display control section 70 performs control so as to switch to whichever mode has been set in the RAM 56 out of the standard mode or the wide-angle mode immediately prior to the vehicle 10 being driven in reverse. Namely, in cases in which the standard mode has been set in the RAM 56 immediately prior to reverse driving, the display control section 70 displays the image M1 corresponding to the standard mode on the display section 64 in the forward driving state after the switching operation. Alternatively, in cases in which the wide-angle mode has been set in the RAM 56 immediately prior to reverse driving, the display control section 70 displays the image M2 corresponding to the wide-angle mode on the display section 64 in the forward driving state after the switching operation.

Display in Each Mode

Figure 4:
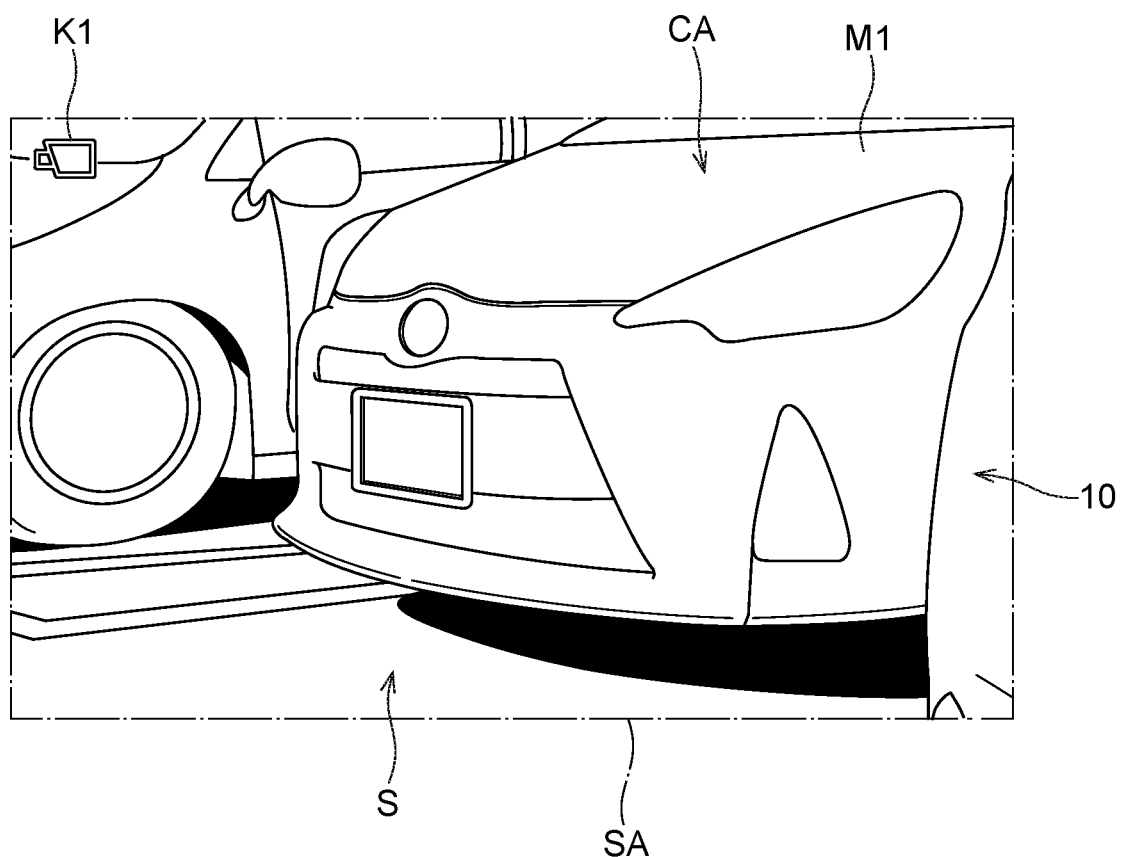
FIG. 4 is a schematic view illustrating an example of an image displayed on a monitor unit illustrated in FIG. 1 in a standard mode.

FIG. 4 illustrates the image M1 within the first imaging range SA displayed on the right monitor 34 (see FIG. 2) in the standard mode. A status indicator K1 indicating that the display system 20 (see FIG. 2) is in operation is displayed at the upper-left of the image M1. The aspect ratio of the image M1 is a standard aspect ratio. Note that in the first exemplary embodiment and a second exemplary embodiment described later, the aspect ratio refers to the aspect ratio of an image, and indicates a width to height ratio of the image. The standard aspect ratio is equivalent to a predetermined screen aspect ratio suited to the screen sizes of the left monitor 32 (see FIG. 2) and the right monitor 34.

Figure 5:
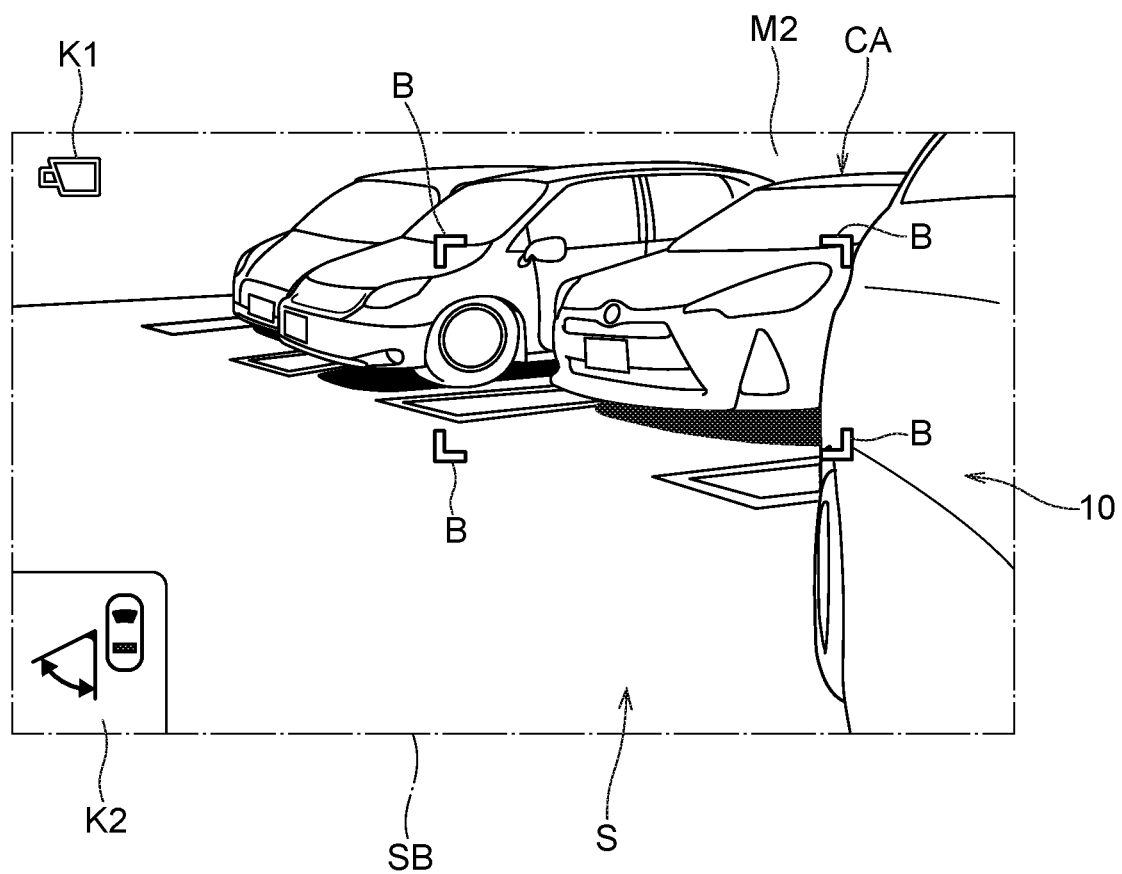
FIG. 5 is a schematic view illustrating an example of an image displayed on a monitor unit illustrated in FIG. 1 in a wide-angle mode.

FIG. 5 illustrates the image M2 within the second imaging range SB displayed on the right monitor 34 (see FIG. 2) in the wide-angle mode. The status indicator K1 is displayed at the upper-left of the image M2. A status indicator K2 indicating the range displayed relative to the vehicle 10 is displayed at the lower-left of the image M2. As an example, brackets B to enable the occupant of the vehicle 10 to roughly perceive the distance to a vehicle CA at the rear are also displayed in the image M2. The brackets B correspond to four corners of the range of the image displayed in the first imaging range SA. Employing the brackets B prevents the occupant from misjudging the distance between the vehicle 10 and the vehicle CA before and after manually zooming in on or zooming out from the image, for example.

Figure 6:
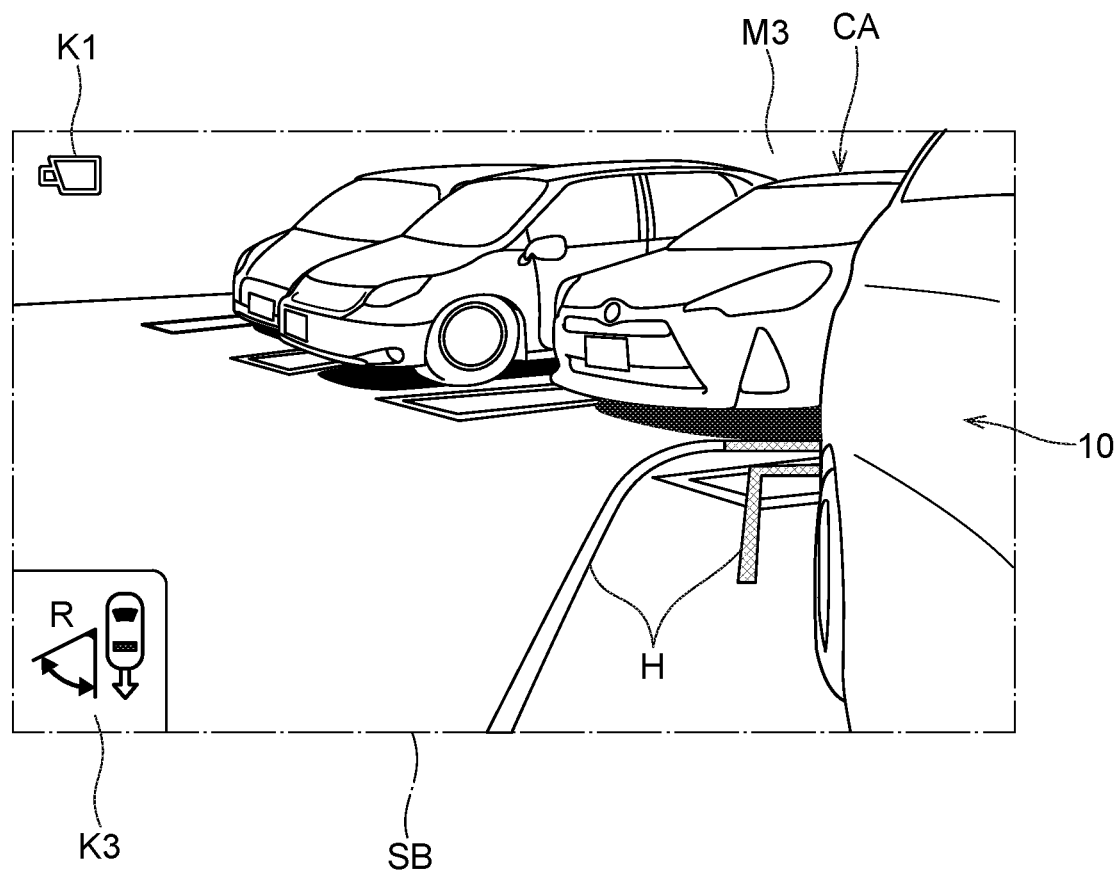
FIG. 6 is a schematic view illustrating an example of an image displayed on a monitor unit illustrated in FIG. 1 in a reverse driving mode.

FIG. 6 illustrates the image M3 within the second imaging range SB displayed on the right monitor 34 (see FIG. 2) in the reverse driving mode. A status indicator K3 indicating that the vehicle 10 is reversing is displayed at the lower-left of the image M3. In contrast to the status indicator K2 (see FIG. 5), an R mark and an arrow symbol representing a state in which the vehicle 10 is reversing have been added to the status indicator K3.

As an example, the assist lines H to enable the occupant of the vehicle 10 to accurately perceive the distance to the vehicle CA at the rear are displayed in the image M3. The assist lines H are an example of assist information for assisting a reversing operation of the vehicle 10. The assist lines H are also an example of distance guidelines indicating the clearance between the vehicle 10 (the occupant's vehicle) and the vehicle CA at the rear. As an example in the present exemplary embodiment, in the reverse driving mode, instead of the brackets B (see FIG. 5) that are displayed in the image M2 (see FIG. 5) in the wide-angle mode, the assist lines H are displayed in the image M3 in this manner. In other words, in the reverse driving mode of the present exemplary embodiment, the image M3, which has a wider angle than the view angle of the image in the standard mode and which includes the assist lines H serving as assist information, is displayed on the right monitor 34 (see FIG. 2).

Figure 7:
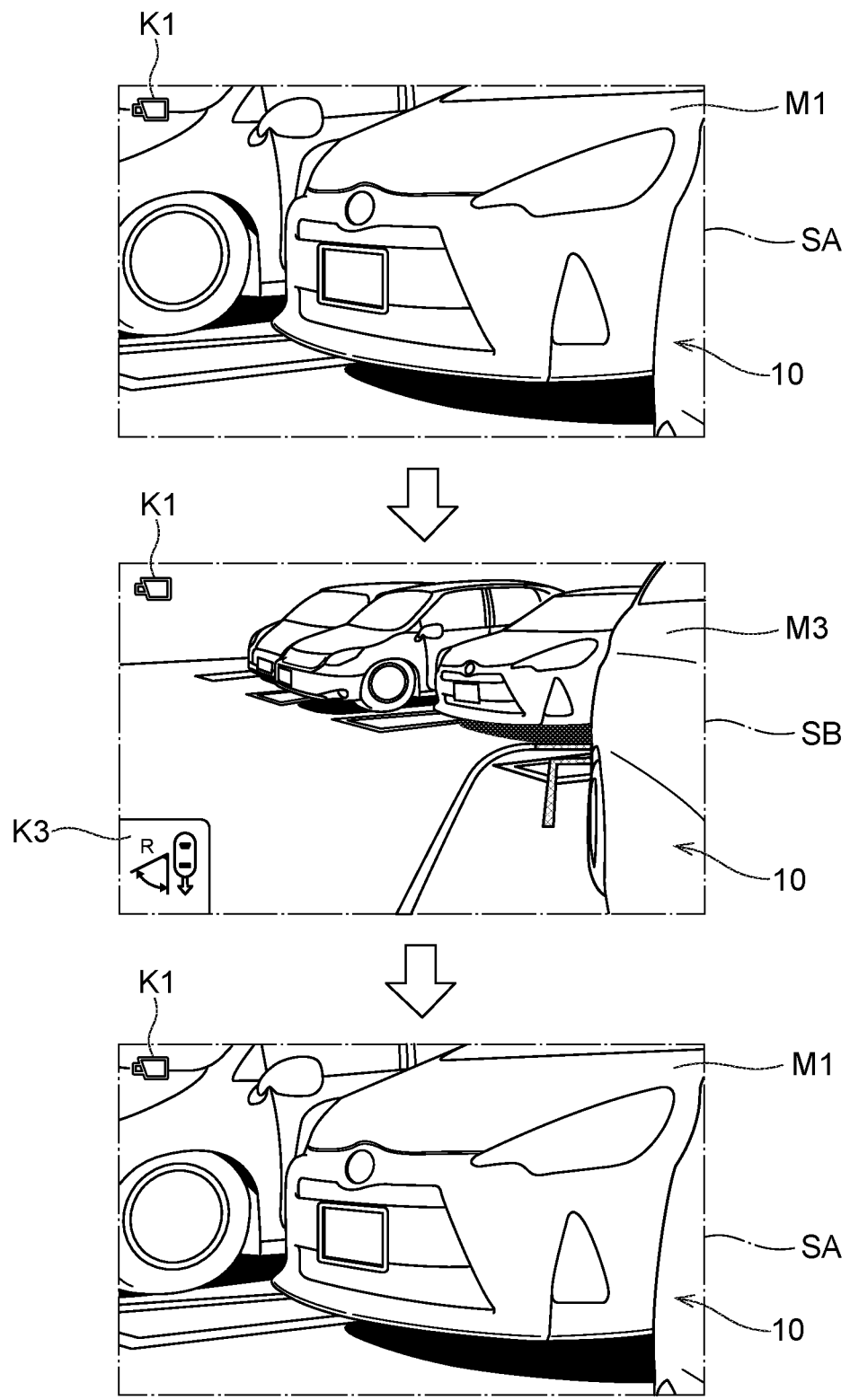
FIG. 7 illustrates schematic views of states when switching images between the standard mode illustrated in FIG. 4 and the wide-angle mode illustrated in FIG. 5.

Note that images corresponding to the standard mode, the wide-angle mode, and the reverse driving mode are displayed on the left monitor 32 (see FIG. 2) similarly to on the right monitor 34, albeit for a different imaging location. The status indicators K1, K2, K3, the brackets B, and the assist lines H respectively displayed in at least one out of FIG. 5, FIG. 6, or FIG. 7 are controlled by display processing (display switching) performed by the display control section 70.

Operation and Advantageous Effects

Explanation follows regarding operation of the display system 20 of the first exemplary embodiment.

Figure 9:
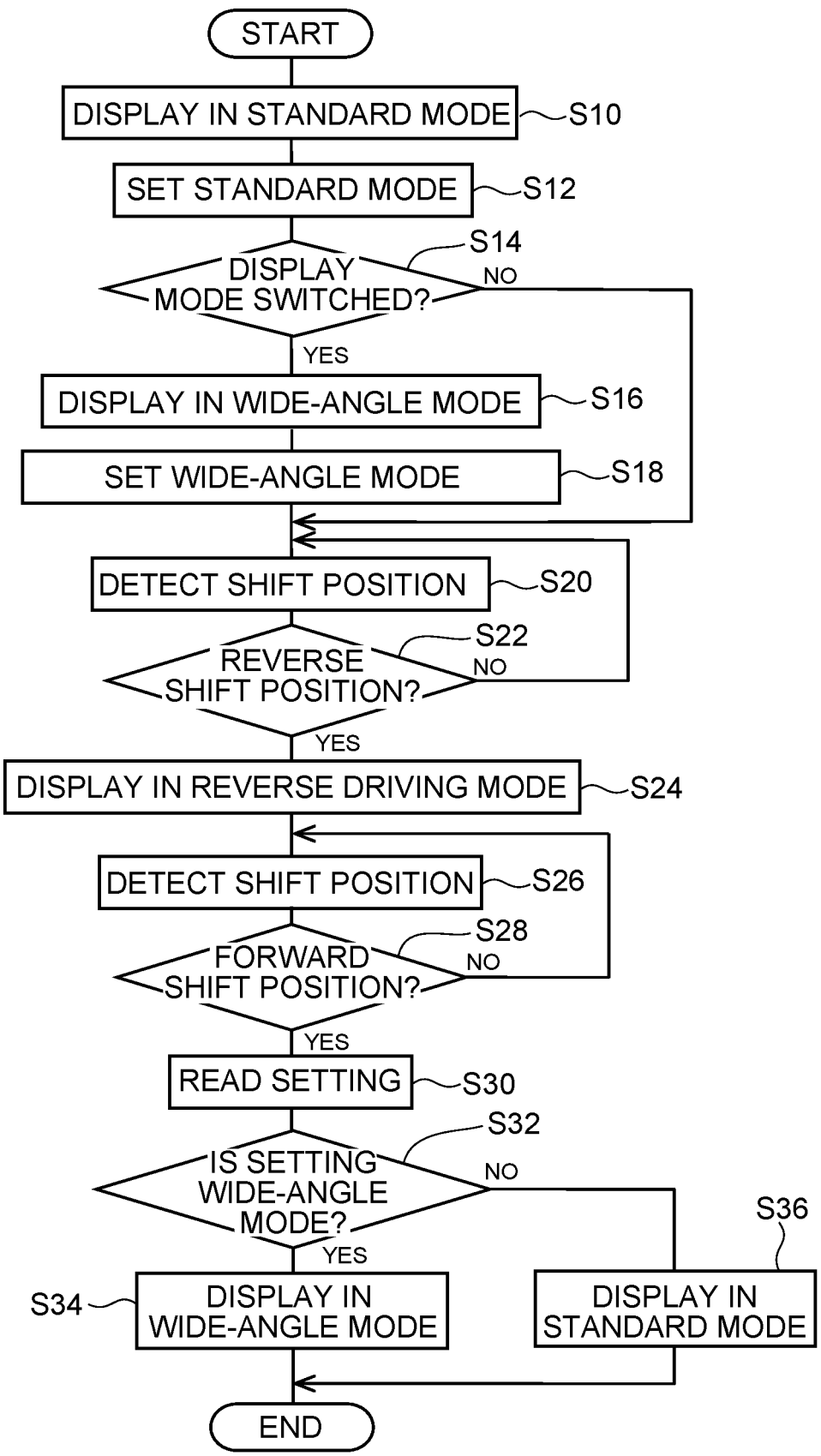
FIG. 9 is a flowchart illustrating a flow of the display switching processing illustrated in FIG. 7 and FIG. 8.

FIG. 9 is a flowchart illustrating a flow of display switching processing performed by the display system 20 (see FIG. 2 and FIG. 3). Note that the description of the respective sections of the display system 20 and the images displayed refers to FIG. 1 to FIG. 6, and reference to individual drawing numbers is omitted. The CPU 52 of the display system 20 reads the display switching program from the ROM 54 or the storage 58 and expands and executes the display switching program in the RAM 56 to perform the display switching processing.

At step S10, the CPU 52 displays the image M1 corresponding to the standard mode on the monitor unit 28 as an initial state. Processing then transitions to step S12.

At step S12, the CPU 52 sets that the fact that the display mode is the standard mode in the RAM 56. Processing then transitions to step S14.

At step S14, the CPU 52 determines whether or not the display mode has been switched based on an information signal regarding the mode selected using the mode selection switch 38. In cases in which a switch has been made (YES), processing transitions to step S16. In cases in which a switch has not been made (NO), processing transitions to step S20.

At step S16, the CPU 52 displays the image M2 corresponding to the wide-angle mode on the monitor unit 28. Processing then transitions to step S18.

At step S18, the CPU 52 sets the fact that the display mode is the wide-angle mode in the RAM 56. Processing then transitions to step S20.

At step S20, the CPU 52 detects the shift position of the shift lever 44 based on the shift position information detected by the shift position sensor 46. Processing then transitions to step S22.

At step S22, the CPU 52 determines whether or not the detected shift position is a reverse shift position. In cases in which the shift position is the reverse shift position (YES), processing transitions to step S24. In cases in which the shift position is not the reverse shift position (i.e. is a forward shift position) (NO), processing transitions to step S20.

At step S24, the CPU 52 displays the image M3 corresponding to the reverse driving mode on the monitor unit 28. Processing then transitions to step S26.

At step S26, the CPU 52 detects the shift position of the shift lever 44 based on the shift position information detected by the shift position sensor 46. Processing then transitions to step S28.

At step S28, the CPU 52 determines whether or not the detected shift position is the forward shift position. In cases in which the shift position is the forward shift position (YES), processing transitions to step S30. In cases in which the shift position is not the forward shift position (i.e. is the reverse shift position) (NO), processing transitions to step S26.

At step S30, the CPU 52 reads the display mode set in the RAM 56. Processing then transitions to step S32.

At step S32, the CPU 52 determines whether or not the display mode set in the RAM 56 is the wide-angle mode. In cases in which the set display mode is the wide-angle mode (YES), processing transitions to step S34. In cases in which the set display mode is not the wide-angle mode (i.e. the set display mode is the standard mode) (NO), processing transitions to step S36.

At step S34, the CPU 52 displays the image M2 corresponding to the wide-angle mode on the monitor unit 28. The program is then ended. Note that as an alternative to ending the program, as processing subsequent to step S34 determination may be made as to whether or not a switch has been made to the standard mode, and processing may transition to step S12 in cases in which a switch to the standard mode has been made.

At step S36, the CPU 52 displays the image M1 corresponding to the standard mode on the monitor unit 28. The program is then ended. Note that as an alternative to ending the program, as processing subsequent to step S36, processing may transition to step S12.

Note that in cases in which processing transitions to step S12 without ending the program, information indicating that driving of the vehicle 10 has ended, such as detection of a rotated state of a non-illustrated ignition key, may be obtained and employed in determination processing to ultimately end the program.

FIG. 7 illustrates states when switching images in a case in which travel (i.e. the shift position) of the vehicle 10 is switched in sequence from a forward driving state in which the standard mode is set as the display mode, to reverse driving, and then back to forward driving. In cases in which the vehicle 10 is traveling forward, the image M1 within the first imaging range SA is displayed on the monitor unit 28 (see FIG. 2). When the vehicle 10 is switched to traveling in reverse, the image M3 within the second imaging range SB is displayed on the monitor unit 28. When the vehicle 10 is then switched back to traveling forward, since the display mode setting read from the RAM 56 is the standard mode, the image M1 within the first imaging range SA is displayed on the monitor unit 28.

Figure 8:
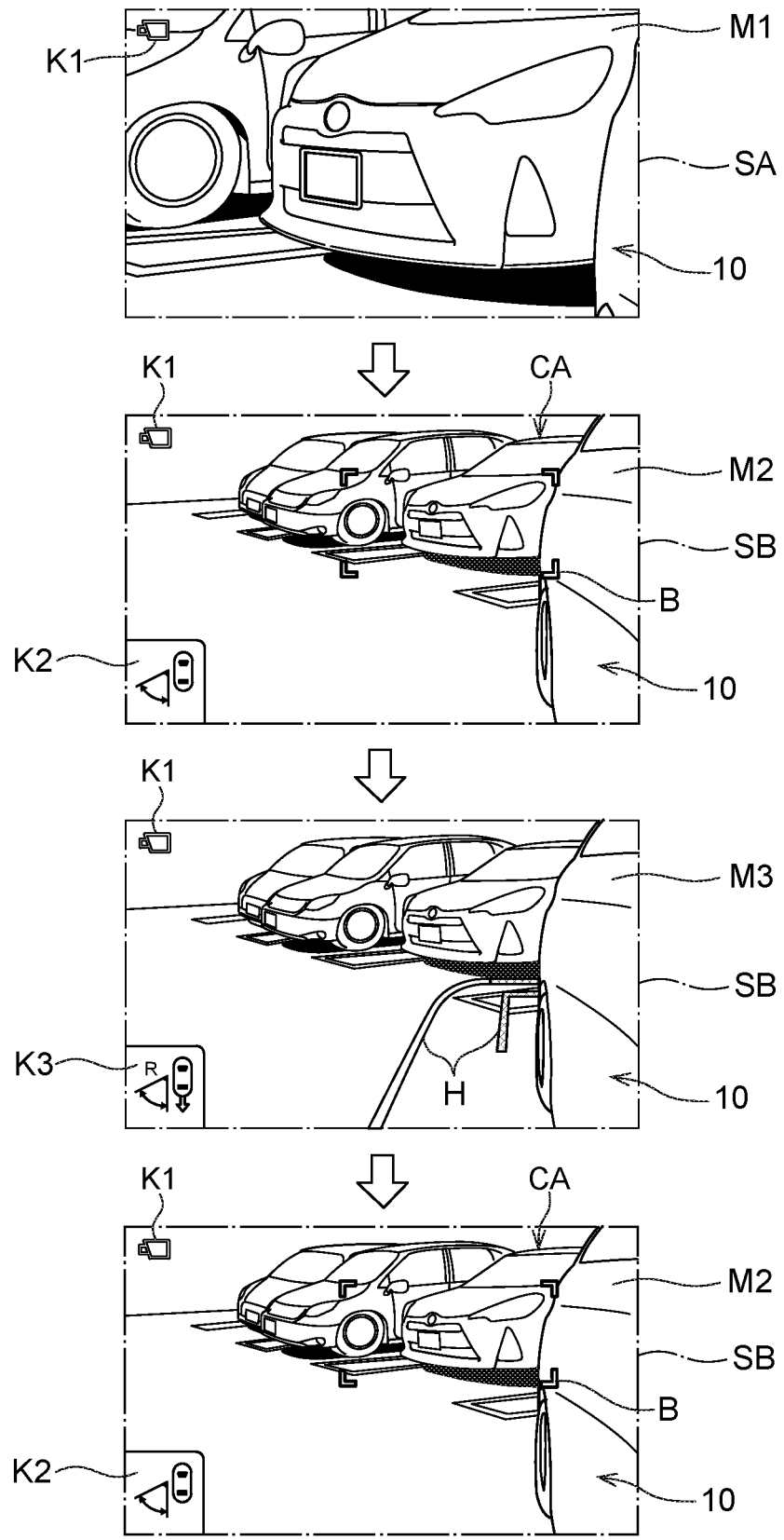
FIG. 8 illustrates schematic views of states when switching images between the standard mode illustrated in FIG. 4, the wide-angle mode illustrated in FIG. 5, and the reverse driving mode illustrated in FIG. 6.

FIG. 8 illustrates states when switching images in a case in which the display mode setting is changed from the standard mode to the wide-angle mode in the forward driving state, and travel (i.e. the shift position) of the vehicle 10 is then switched in sequence to reverse driving and then back to forward driving. First, in the standard mode, the image M1 within the first imaging range SA is displayed on the monitor unit 28 (see FIG. 2). Next, when the wide-angle mode is set while the vehicle 10 is traveling forward, the image M2 within the second imaging range SB is displayed on the monitor unit 28. When the vehicle 10 then travels in reverse, the image M3 within the second imaging range SB is displayed on the monitor unit 28. Next, when the vehicle 10 then travels forward, since the display mode setting read from the RAM 56 is the wide-angle mode, the image M2 within the second imaging range SB is displayed on the monitor unit 28.

As described above, in the display system 20, when an operation to switch from reverse driving to forward driving of the vehicle 10 is performed while in the reverse driving mode, the display control section 70 switches to whichever mode has been set in the RAM 56 out of the standard mode or the wide-angle mode immediately prior to the vehicle 10 being driven in reverse. Thus, the range of the image displayed on the display section 64 before and after an operation to switch to reverse driving and then revert back to forward driving is maintained as only one out of the first imaging range SA or the second imaging range SB. This eliminates the need to operate the switch in order to transition between modes every time switching is performed, thereby enabling frustration felt by the occupant when switching from reverse driving to forward driving to be suppressed.

Second Exemplary Embodiment

Explanation follows regarding a display system 80, serving as an example of an electronic mirror system according to the second exemplary embodiment. The vehicle 10 is provided with the display system 80 instead of the display system 20 (see FIG. 1). Note that configurations that are basically the same as those in the display system 20 are appended with the same reference numerals as in the display system 20, and explanation thereof is omitted.

Figure 10:
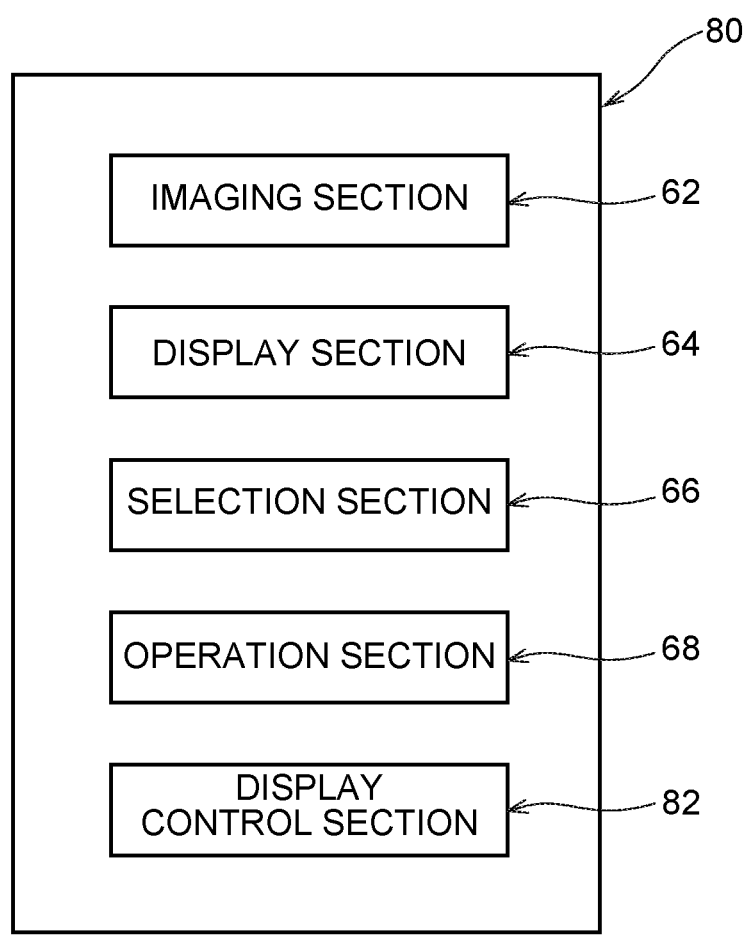
FIG. 10 is a block diagram illustrating an example of functional configuration of a display system according to a second exemplary embodiment.

The display system 80 illustrated in FIG. 10 includes the imaging section 62, the display section 64, the selection section 66, the operation section 68, and a display control section 82 as functional configuration. Each functional configuration is realized by the CPU 52 (see FIG. 2) of the control unit 48 reading and executing a display switching program stored in the ROM 54 or the storage 58 (see FIG. 2). Note that the display system 80 includes the camera unit 22, the monitor unit 28, the switch unit 36, the shift lever unit 42, and the control unit 48 (see FIG. 2 for all units). Hardware configuration of the display system 80 is similar to the hardware configuration of the display system 20 (see FIG. 2).

The display control section 82 receives image information imaged by the imaging section 62, performs image processing on the received image information according to the circumstances, and outputs an image to the display section 64. Namely, after performing image processing according to the circumstances on an image captured by the left rearward-facing camera 24B (see FIG. 2), the image is output to the left monitor 32 (see FIG. 2). Similarly, after performing image processing according to the circumstances on an image captured by the right rearward-facing camera 26B (see FIG. 2), the image is output to the right monitor 34 (see FIG. 2). The display control section 82 also displays the images corresponding to the respective display mode on the display section 64 similarly to in the first exemplary embodiment.

Furthermore, when switching from the wide-angle mode to the reverse driving mode, the display control section 82 increases a vehicle vertical direction display magnification ratio of the images compared to a vehicle vertical direction display magnification ratio immediately prior to the vehicle 10 being driven in reverse. Specifically, the display control section 82 displays an image M4 (see FIG. 11) in a third imaging range SC on the display section 64 as an image for reverse driving with an aspect ratio that is the same as the aspect ratio in the standard mode. The image M4 in the third imaging range SC is an image that has the same view angle as the view angle in the second imaging range SB (see FIG. 5) but a larger display magnification ratio in the vehicle vertical direction than the second imaging range SB.

Figure 11:
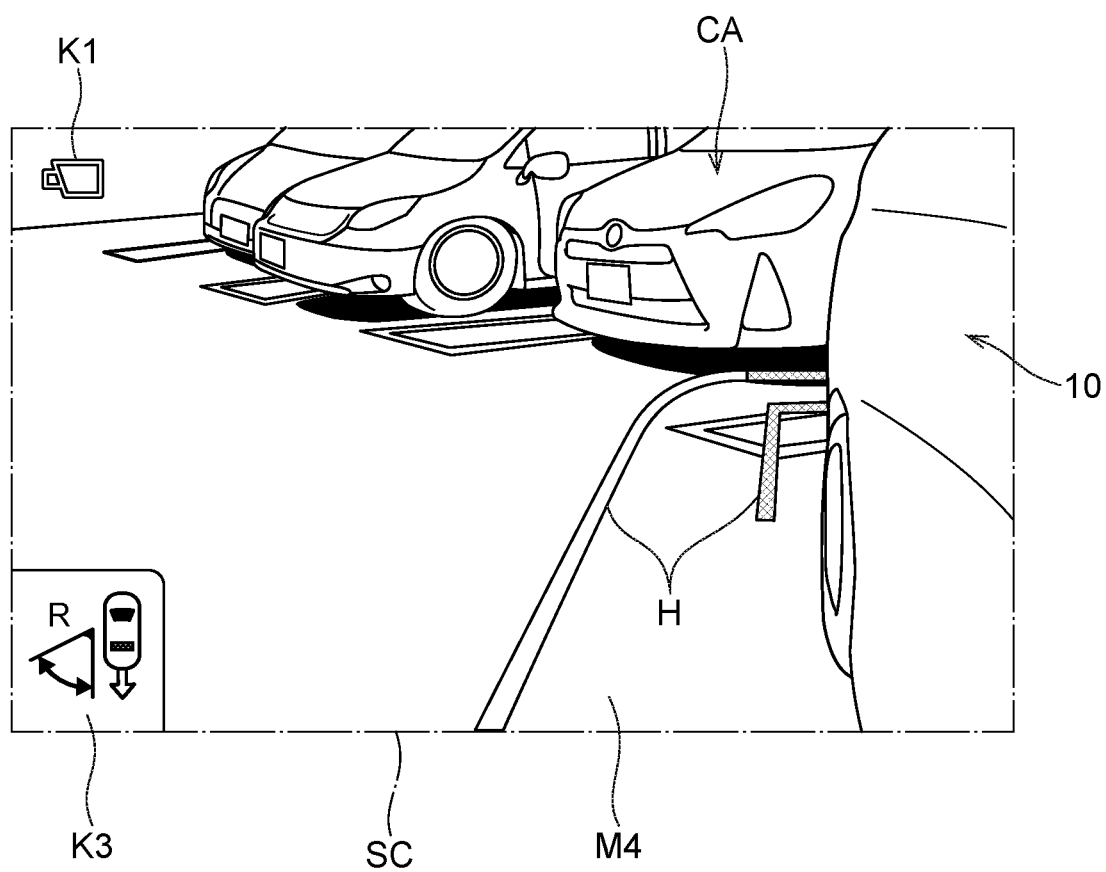
FIG. 11 is a schematic view illustrating an example of an image displayed on a monitor unit of a display system according to the second exemplary embodiment in a reverse driving mode.

As illustrated in FIG. 11, assist lines H are added to the image M4 in the third imaging range SC. The status indicator K1 and the status indicator K3 are also displayed in the image M4.

Operation and Advantageous Effects

Explanation follows regarding operation and advantageous effects of the display system 80 of the second exemplary embodiment. Note that the description of the respective sections of the display system 80 refers to FIG. 1, FIG. 2, and FIG. 10, and reference to individual drawing numbers is omitted. The overall flow of display switching processing by the display system 80 is similar to the overall flow of display switching processing by the display system 20 (see FIG. 2). Explanation of the display system 80 with reference to a flowchart is therefore omitted.

Figure 12:
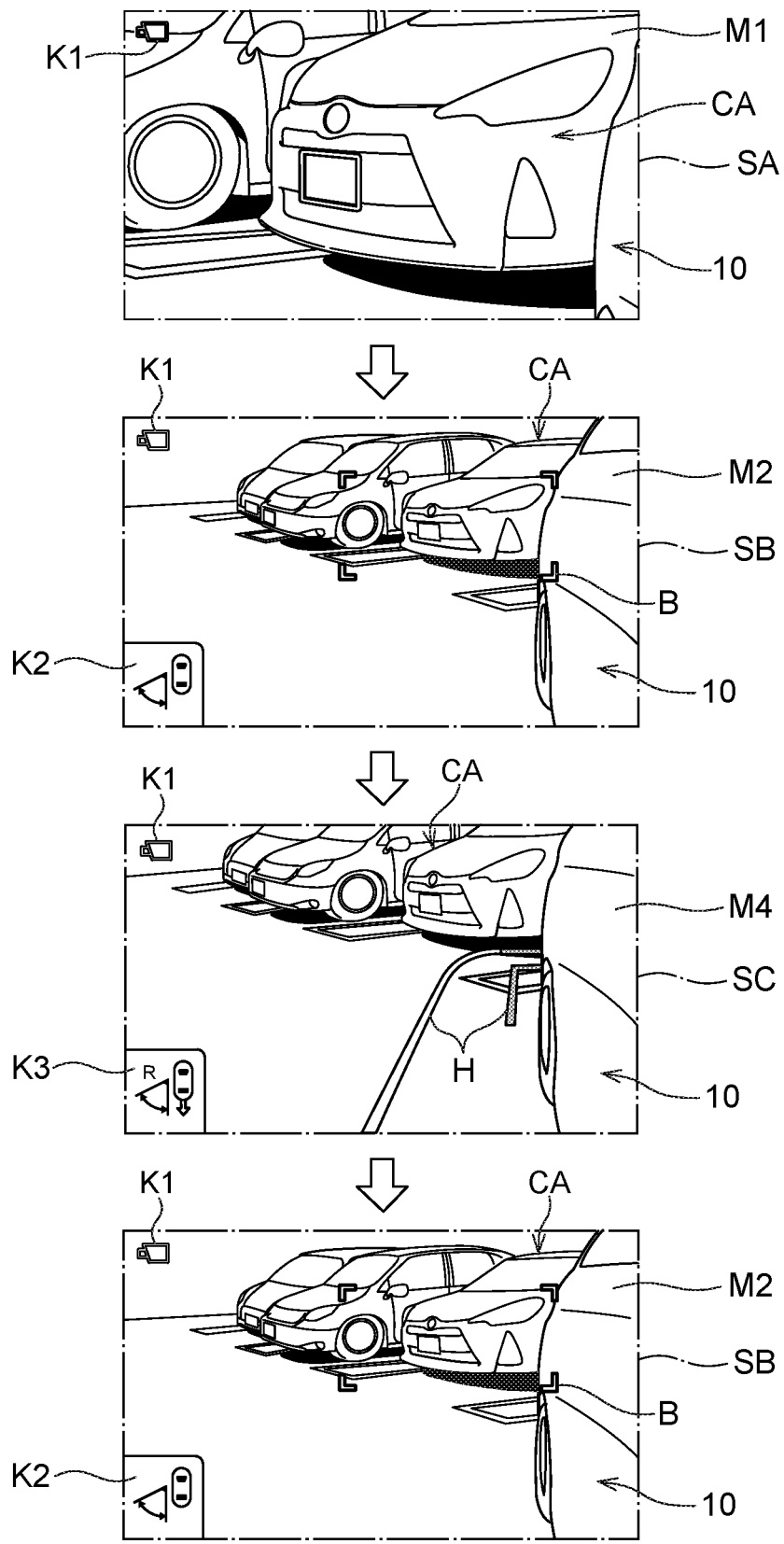
FIG. 12 illustrates schematic views of states when switching images between a standard mode, a wide-angle mode, and a reverse driving mode in a display system according to the second exemplary embodiment.

FIG. 12 illustrates states when switching images in a case in which the display mode setting is changed from the standard mode to the wide-angle mode in the forward driving state, and travel (i.e. the shift position) of the vehicle 10 is then switched in sequence to reverse driving and then back to forward driving. First, in the standard mode, the image M1 within the first imaging range SA is displayed on the monitor unit 28 (see FIG. 2). Next, when the wide-angle mode is set while the vehicle 10 is traveling forward, the image M2 within the second imaging range SB is displayed on the monitor unit 28. When the vehicle 10 then travels in reverse, the image M4 within the third imaging range SC is displayed on the monitor unit 28. Next, when the vehicle 10 then travels forward, since the display mode setting read from the RAM 56 is the wide-angle mode, the image M2 within the second imaging range SB is displayed on the monitor unit 28.

Although not illustrated in the drawings, in cases in which the display mode setting is the standard mode and the vehicle 10 is traveling forward, the image M1 within the first imaging range SA is displayed on the monitor unit 28. In such cases, if the vehicle 10 is then switched to traveling in reverse, the image M4 of the third imaging range SC is displayed on the monitor unit 28. When the vehicle 10 is then switched to travel forward, since the display mode setting read from the RAM 56 is the standard mode, the image M1 within the first imaging range SA is displayed on the monitor unit 28.

As described above, in the display system 80, when an operation to switch from reverse driving to forward driving of the vehicle 10 is performed while in the reverse driving mode, the display control section 82 switches to whichever mode has been set in the RAM 56 out of the standard mode or the wide-angle mode immediately prior to the vehicle 10 being driven in reverse. Thus, the range of the image displayed on the display section 64 before and after an operation to switch to reverse driving and then revert back to forward driving is maintained as only one out of the first imaging range SA or the second imaging range SB. This eliminates the need to operate the switch in order to transition between modes every time switching is performed, thereby enabling frustration felt by the occupant when switching from reverse driving to forward driving to be suppressed.

Furthermore, in the display system 80, the wide-angle state of the images displayed on the display section 64 during reverse driving is maintained, and the aspect ratio of the image M4 of the third imaging range SC is the same as the aspect ratio of the image in the standard mode. Thus, the aspect ratio of objects as perceived by the occupant during forward driving of the vehicle 10 is similar to the aspect ratio of objects as perceived by the occupant when the vehicle 10 is being driven in reverse, thereby enabling any unnatural sensation experienced by the occupant when driving in reverse to be suppressed. A vehicle CA (see FIG. 12) at the rear is an example of an object perceived by the occupant.

Note that the present disclosure is not limited to the above exemplary embodiments.

Although the camera unit 22 is configured by the left rearward-facing camera 24B and the right rearward-facing camera 26B, there is no limitation thereto, and the camera unit 22 may be configured by three or more cameras, radar devices, or the like.

Although the monitor unit 28 is configured by the left monitor 32 and the right monitor 34, there is no limitation thereto, and the monitor unit 28 may be configured by three or more monitors.

The switch unit 36 is not limited to a configuration in which the single mode selection switch 38 is switched ON and OFF, and may be configured by two switches, one of which is set to OFF when the other is switched ON. The switch unit 36 may alternatively be configured by a touch panel that is touch-operated by a finger of the occupant.

The shift position sensor 46 is not limited to being a contact-type mechanical switch, and may for example be a sensor that detects a magnetic field, or an optical sensor that detects whether light has been blocked.

Configuration may be made such that all shift (range) positions of the shift lever 44 other than the R range are treated as forward shift positions. Namely, the control of the present exemplary embodiment would apply not only when changing shift in sequence from the D range, to the R range, and back to the D range, but also for example when changing the shift position in sequence from the D range to the R range, and then to the N range, and when changing the shift position in sequence from the N range to the R range, and then to the P range.

Note that although the display switching processing is executed by the CPU 52 reading software (a program) in each of the exemplary embodiments, the display switching processing may be executed by various processors other than the CPU 52. Examples of such processors include programmable logic devices (PLD) with circuit configurations that are reconfigurable after manufacture, such as field-programmable gate arrays (FPGA), and dedicated electronic circuits that are processors including circuit configurations custom designed to execute specific processing, such as application specific integrated circuits (ASIC) or the like. Moreover, the display switching processing may be executed by one such processor, or may be executed by a combination of two or more processors of the same type or different types (for example plural FPGAs, a combination of a CPU and an FPGA, etc.). More specifically, the hardware structure of such types of processor is an electronic circuit combining circuit elements such as semiconductor elements and the like.

Moreover, in each of the above exemplary embodiments, cases have been described in which the display switching program is pre-stored (installed) in the ROM 54 or the storage 58. However, there is no limitation thereto. The program may be provided in a format recorded on a recording medium such as compact disc read only memory (CD-ROM), digital versatile disc read only memory (DVD-ROM), or universal serial bus (USB) memory. Alternatively, the program may be provided in a format to be downloaded from an external device over a network.

What is claimed is:
1. An electronic mirror system, comprising:
a camera configured to perform imaging toward a rear and a side of a vehicle, and configured to change an imaging range between a first imaging range and a second imaging range that is wider than the first imaging range;
a monitor configured to display an image captured by the camera;
a mode selection switch configured to allow an occupant of the vehicle to select one of (i) a standard mode, in which an image corresponding to the first imaging range is displayed on the monitor, or (ii) a wide-angle mode, in which an image corresponding to the second imaging range is displayed on the monitor;
a shift lever configured to enable operation of one of forward driving or reverse driving of the vehicle; and
a processor programmed to:
set the monitor with whichever of the standard mode or the wide-angle mode has been selected by the occupant using the mode selection switch,
display an image corresponding to the first imaging range on the monitor in a case in which the standard mode has been selected,
display an image corresponding to the second imaging range on the monitor in a case in which the wide-angle mode has been selected,
display an image for reverse driving on the monitor as a reverse driving mode in a case in which an operation to drive the vehicle in reverse has been performed using the shift lever, and switch the mode to whichever of the standard mode or the wide-angle mode was set by the occupant of the vehicle immediately prior to the vehicle being driven in reverse in a case in which an operation to switch from reverse driving to forward driving of the vehicle has been performed using the shift lever while in the reverse driving mode, wherein the processor stores one mode out of the standard mode or the wide-angle mode that was selected immediately prior to the vehicle being driven in reverse in a memory.

2. The electronic mirror system of claim 1, wherein the processor is further programmed to display an image corresponding to a third imaging range on the monitor as the image for reverse driving, the third imaging range having the same view angle as a view angle of the second imaging range and a larger vehicle vertical direction display magnification ratio than the second imaging range, such that an aspect ratio of the third imaging range is the same as an aspect ratio in the standard mode.

3. The electronic mirror system of claim 1, wherein the processor is further programmed to display an indicator indicating that reverse driving is in progress on an image corresponding to the second imaging range, as the image for reverse driving.

4. The electronic mirror system of claim 1, wherein the processor is further programmed to display brackets at positions corresponding to four corners of the first imaging range in the image corresponding to the second imaging range when in the wide-angle mode.

\* \* \* \* \*